Patented Nov. 7, 1933

1,934,450

UNITED STATES PATENT OFFICE 1,934,450

PROCESS FOR THE MANUFACTURE OF CELLULOSE ACETATE AND PRODUCT THEREOF

Samuel E. Sheppard and Leon W. Eberlin, Rochester, N. Y., assignors to Eastman Kodak Company, Rochester, N. Y., a corporation of New York No Drawing. Application January 3, 1929.
Serial No. 330,018

25 Claims. (Cl. 23—243)

This invention relates to cellulose acetate and to the preparation thereof for use in the manufacture of various products, such as artificial silk, photographic film support, lacquers, plastic masses and the like.

Cellulose acetate is produced by the action of acetylating agents on cellulose in the presence of catalysts. The reaction mixture may be subjected subsequently to a hydrolyzing treatment. The cellulose acetate, either hydrolyzed or in its initial form, may be separated from the reaction mixture by precipitation, spray drying or otherwise. The product is a dry powder which is subsequently dissolved or mixed with plastifiers or other agents and utilized in the production of various solid and liquid products.

Cellulose acetate, particularly if prepared by spray drying, is a powdered material subject to dusting and is highly electro-static. It is consequently subject to hazards such as dust explosions.

It is the object of the present invention to provide cellulose acetate in the form of a non-dusting powder adapted to retain electro-static charges and to thus avoid the hazards mentioned.

Further objects of the invention are to incorporate with the cellulose acetate, softening or plastifying agents which facilitate the preparation of plastic and other compounds, and a method of preparing cellulose acetate in a form which adapts it for subsequent commercial use.

We have discovered that the tendency of cellulose acetate to dust and to form explosive mixtures with air can be overcome by incorporating with the powder certain oleaginous materials including oils, fats, and waxes. These materials afford the additional advantage, in combination with cellulose acetate, in that they are softening agents or plastifiers. They do not, therefore, affect the cellulose acetate adversely with reference to its various uses and, in fact, facilitate the incorporation of the powder in various compositions, it being generally necessary to include softening or plastifying agents in such compositions.

In carrying out the invention, the cellulose acetate is recovered from the reaction mixture in any suitable manner, for example, by precipitation or preferably by spray drying, as described for example, in the U. S. patent by Webb, No. 1,516,225, or by the preparation of the cellulose acetate in the form of a very finely divided porous powder as described in our co-pending application, Serial No. 330,019, filed January 3, 1929. The powdered cellulose acetate produced by precipitation or by spray drying is washed with water to separate contaminating constituents which are the by-products of the reaction. The powder thus prepared in a substantially pure condition is then subjected to a liquid in which the oleaginous material is incorporated, either as a solution or partial solution or preferably as an emulsion. The powder is thoroughly agitated in this liquid agent to deposit on the surfaces of the particles films of the oleaginous material. The surplus liquid is then removed, preferably by filtration, leaving the particles of powder with the coating films which prevent dusting, retain electro-static charges, thus preventing explosions when the finely divided material is mingled with air in any subsequent handling or operation. The films being of material capable of acting as a softening or plastifying agent, facilitate the incorporation of the powder in various mixtures and compositions for the production of plastic and similar products.

Various oleaginous materials may be used for the purpose of the invention, including among others, castor oil, oleic acid, and monochlornaphthalene or organic esters of high molecular weight insoluble in water and being substantially a non-solvent of the cellulose acetate, such, for example, as sodium oleate or methyl margarate. These materials are readily incorporated in solution, partial solution, or in emulsions and can be deposited in the manner described on the particles of cellulose acetate. They are softening agents or plastifiers and, when deposited on the particles, they prevent dusting and retain electro-static charges.

In carrying out the invention, we prefer to prepare an emulsion of the oleaginous material by mixing the latter with water, ammonia, and a suitable solvent, for example, ethyl alcohol. The emulsion is produced by introducing the mixture to an homogenizer or emulsifier of which various types are available.

After the cellulose acetate powder has been substantially freed from contaminating constituents, it is subjected to a "final wash" and a proportion of the emulsion is introduced with the water employed for the "final wash." The cellulose acetete powder is agitated with the water containing the emulsion for a sufficient period to accomplish the desired coating and to remove final traces of undesirable constituents in the powder. The water is removed then by filtering, centrifuging, or otherwise and may be again used in treating additional batches of the cellulose acetate after addition of a sufficient quantity of the emulsion. The powder is dried to remove water. The particles remain coated with a thin layer of film of the oleaginous material, the thickness of the film depending upon the concentration of the "final wash" with respect to the emulsion. We have found it convenient and satisfactory to so treat the powder that it retains approximately 2% by weight of the oleaginous material based on the dry weight of the cellulose acetate.

The following examples indicate the preferred composition of the materials employed, it being understood that these are representative merely of the practice to be followed:

*Example I.*—The emulsion may consist of the following constituents:

|  | cc. |
|---|---|
| Castor oil | 180 |
| Ethyl alcohol | 300 |
| Ammonia (28%) | 200 |
| Water | 400 |

This mixture, when emulsified, is utilized as the "final wash" in proportion with respect to the cellulose acetate powder to accomplish the intended purpose. For example, the emulsion described may be thoroughly agitated with 300 grams of spray-dried cellulose acetate powder. The excess liquid is then removed, for example, by a suction filter, and the powder is dried. The powder will carry about 1% of castor oil and is free from tendency to dust.

*Example II.*—In place of the emulsion as described, the following constituents may be employed:

|  | cc. |
|---|---|
| Oleic acid | 70 |
| Ammonia (28%) | 80 |
| Ethyl alcohol | 350 |
| Water | 1500 |

This emulsion is agitated with 300 grams of spray-dried cellulose acetate powder. When the surplus liquid has been removed by filtration or otherwise, the powder is dried and contains about 1.8% oleic acid. It is likewise free from tendency to dust.

*Example III.*—An emulsion including the following ingredients may be used:

|  | cc. |
|---|---|
| Monochlornaphthalene | 150 |
| Castor oil | 40 |
| Ammonia (28%) | 40 |
| Water | 4000 |

This emulsion is agitated with 500 grams of dry cellulose acetate powder. The surplus liquid is removed by filtration or otherwise and the powder is again dried. It includes about 12% of monochlornaphthalene and is completely non-dusting. Monochlornaphthalene is, moreover, a plastifier which can be used advantageously in preparing plastic and other compounds including cellulose acetate. Cellulose acetate powder, including monochlornaphthalene in the proportion indicated, may be combined with various solvents to produce plastic compositions.

Although this invention primarily describes the prevention of dusting of cellulose acetate powder, the method is obviously applicable to all cellulose colloidalized bodies such as cellulose esters or ethers or the dissolved cellulose products such as viscose when these materials are prepared in the comminuted or powdered form.

As hereinbefore indicated, the invention is not limited to the particular oleaginous materials mentioned herein. The term "oleaginous materials" as used in the claims, includes oils, fats, and waxes, which are non-solvents for cellulose acetates, are not detrimental in compositions including cellulose acetates and preferably are suitable as softeners or plastifiers in such compositions.

Various changes may be made therefore in the procedure and the materials employed for the purpose of the invention without departing therefrom or sacrificing any of the advantages thereof.

Having thus described our invention, what we claim as new and desire to secure by Letters Patent is:

1. A product comprising a cellulose colloidalized product in powdered form, the particles having an oleaginous film which prevents dusting and retains electro-static charges.

2. A product comprising a cellulose derivative in powdered form, the particles having an oleaginous film which prevents dusting and retains electro-static charges.

3. A product comprising a cellulose ester in powdered form, the particles having an oleaginous film which prevents dusting and retains electro-static charges.

4. A product comprising a cellulose acetate in powdered form, the particles having an oleaginous film which prevents dusting and retains electro-static charges.

5. A product comprising cellulose acetate in powdered form, the particles having a film of an oleaginous softening agent.

6. A product comprising cellulose acetate in powdered form, the particles having a film of castor oil.

7. A method of preparing a cellulose colloidalized product in powdered form which comprises depositing on the particles a film of oleaginous material.

8. A method of preparing a cellulose colloidalized product in powdered form which comprises subjecting the product to an emulsion of an oleaginous material.

9. A method of preparing a cellulose ester in powdered form which comprises subjecting the powder to an emulsion of an oleaginous material.

10. A method of preparing cellulose acetate which comprises separating the cellulose acetate from the reaction mixture in powdered form, washing the powder to remove contaminating constituents and finally depositing on the particles a film of oleaginous material.

11. A method of preparing cellulose acetate which comprises separating the cellulose acetate from the reaction mixture in powdered form, washing the powder to remove contaminating constituents and finally depositing on the particles a film of an oleaginous softening agent.

12. A method of preparing cellulose acetate which comprises separating the cellulose acetate from the reaction mixture in powdered form, washing the powder to remove contaminating constituents and finally depositing on the particles a film of castor oil.

13. A method of preparing cellulose acetate which comprises separating the cellulose acetate from the reaction mixture in powdered form, washing the powder to remove contaminating constituents and finally subjecting the powder to the action of an emulsion containing an oleaginous material.

14. A method of preparing cellulose acetate which comprises separating the cellulose acetate from the reaction mixture in powdered form, washing the powder to remove contaminating constituents and finally subjecting the powder to the action of an emulsion containing an oleaginous softening agent.

15. A method of preparing cellulose acetate which comprises separating the cellulose acetate from the reaction mixture in powdered form, washing the powder to remove contaminating constituents and finally subjecting the powder to the action of an emulsion containing castor oil.

16. A product comprising a cellulose ester in powdered form, the particles having thereon a film of a material which is substantially insoluble in water and substantially a non-solvent of the cellulose ester selected from the group consisting of higher fatty acids and their oleaginous derivatives.

17. A product comprising cellulose acetate in powdered form, the particles having thereon a film of a material which is substantially insoluble in water and substantially a non-solvent of the acetate selected from the group consisting of higher fatty acids and their oleaginous derivatives.

18. A method of preparing a cellulose ester in powdered form which comprises subjecting the powder to an emulsion of material selected from the group consisting of higher fatty acids and their oleaginous derivatives.

19. A method of preparing cellulose acetate in powdered form which comprises subjecting the powder to an emulsion of material selected from the group consisting of higher fatty acids and their oleaginous derivatives.

20. A product comprising a cellulose ester in powdered form, the particles having thereon a film of a substance which is substantially insoluble in water and substantially a non-solvent of the cellulose ester, selected from the group consisting of monochlornaphthalene, higher fatty acids and their oleaginous derivatives.

21. A product comprising cellulose acetate in powdered form, the particles having thereon a film of a substance which is substantially insoluble in water and substantially a non-solvent of the acetate, selected from the group consisting of monochlornaphthalene, higher fatty acids and their oleaginous derivatives.

22. A method of preparing a cellulose ester in powdered form which comprises subjecting the powder to an emulsion of a substance selected from the group consisting of monochlornaphthalene, higher fatty acids and their oleaginous derivatives.

23. A method of preparing cellulose acetate in powdered form which comprises subjecting the powder to an emulsion of a substance selected from the group consisting of monochlornaphthalene, higher fatty acids and their oleaginous derivatives.

24. A product comprising a cellulose ester in powdered form, the particles having thereon a film of a material selected from the group consisting of castor oil, oleic acid, monochlornaphthalene, sodium oleate, and methyl margarate.

25. A product comprising cellulose acetate in powdered form, the particles having thereon a film of a substance selected from the group consisting of castor oil, oleic acid, monochlornaphthalene, sodium oleate, and methyl margarate.

SAMUEL E. SHEPPARD.
LEON W. EBERLIN.